May 12, 1953 C. E. BESSEY 2,638,512

DIRECT COUPLED AMPLIFYING SYSTEM

Filed Sept. 8, 1949

*INVENTOR.*
CARLTON E. BESSEY

*BY*

Harry M. Saragovitz

*ATTORNEY*

Patented May 12, 1953

2,638,512

UNITED STATES PATENT OFFICE 2,638,512

DIRECT COUPLED AMPLIFYING SYSTEM

Carlton E. Bessey, Little Silver, N. J.

Application September 8, 1949, Serial No. 114,633

4 Claims. (Cl. 179—171)

(Granted under Title 35, U. S. Code (1952), sec. 266)

The invention described herein may be manufactured and used by or for the Government for governmental purposes without the payment to me of any royalty thereon.

The invention relates to direct and alternating current amplifying systems and particularly to balanced amplifiers having high amplification and uniform frequency response.

It is an object of this invention to provide improved means to amplify direct and alternating currents. More specifically, it is an object of this invention to provide alternating current and direct current amplifiers achieving a high degree of amplification. A further object is to provide an amplifier having stability of operation under varying power supply voltages.

Figure 1:
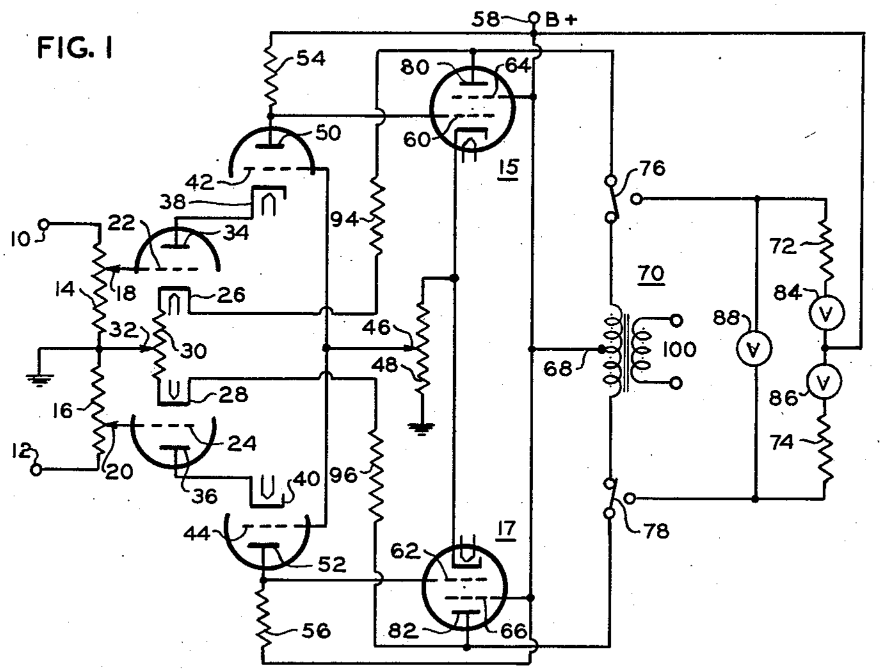
Figure 2:
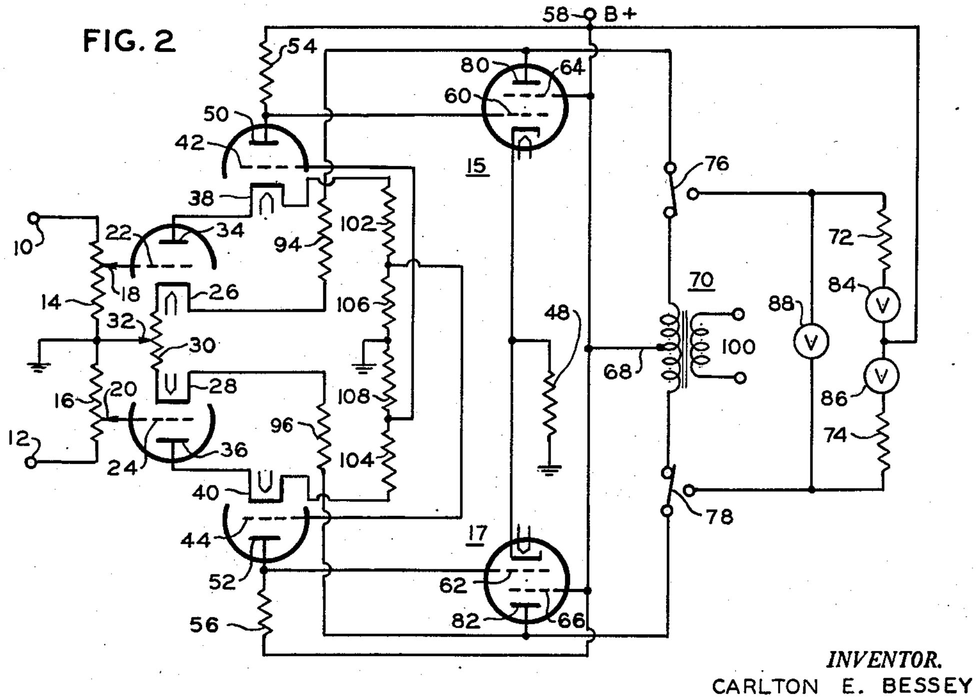

The foregoing objects, together with other objects and advantages that will appear as the specification proceeds, are achieved by means of a cascaded arrangement of push-pull amplifying stages. These said stages are so arranged that the first stage in the series serves as an input amplifier and the second stage amplifies the output of said first stage and varies in impedance in phase with variations in the impedance of the first stage. The first and second stages are connected across the grid-cathode circuits of the final stage, the outputs thereof being combined in push-pull. The system provides high gain, good stability and a flat frequency response over a wide range. For a better understanding of the invention, reference is made to the accompanying specification and to the drawings wherein:

Fig. 1 is a schematic circuit diagram of a balanced push-pull amplifier system illustrating the invention; and, Fig. 2 is a schematic circuit diagram of a balanced push-pull amplifier system illustrating a modification of the invention.

Referring generally to the drawings, means are provided to apply a signal to a first amplifier stage, here shown as a dual triode electron discharge device. The output of each section of this tube is applied to a corresponding section of a second dual-triode electron discharge device in a plate-to-cathode connection, both impedances being varied in phase. Corresponding series-connected sections of the tubes are connected across the grid-cathode circuits of power tubes 15, 17. The amplified signals developed by the last named tubes are combined in push-pull in a well known manner.

The invention is here shown in push-pull arrangement in order that the advantages of balanced operation may be pointed out. However, it will be apparent that the invention is equally applicable to single channeled amplifier systems, and the circuits illustrated herein may be so operated by application of a signal between grid and cathode of one section of the first stage, the system then being equivalent to three single tubes arranged in cascade.

Referring now in detail to Fig. 1, input terminals 10, 12 are connected to the outer ends of a series arrangement comprising ganged potentiometers 14, 16, the inner ends of which are connected to ground. Movable arms 18, 20 of said potentiometers 14, 16 are connected to control grids 22, 24 of a dual-triode discharge device, the corresponding cathodes 26, 28 of this tube being connected to opposite terminals of a potentiometer 30, the movable arm 32 of which is connected to ground. Plates 34, 36 of this tube are directly connected to cathodes 38, 40 of a second dual-triode discharge device. Grids 42, 44 of this tube are directly connected to movable arm 46 of potentiometer 48, said potentiometer being in the cathode circuit of tetrode discharge devices 15, 17. Plates 50, 52 of the second tube are connected respectively through series resistors 54, 56 to a common source of plate potential 58.

It will thus be seen that the respective space-current paths of one tube and resistors 54, 56 comprise the output circuits for corresponding triode sections of the other tube.

Control grids 60, 62 of tubes 15, 17 are connected respectively to the low potential ends of resistors 54, 56 the bias on said grids being thereby determined by the drop across said resistors. Screen grids 64, 66 of tubes 15, 17 are connected directly to source 58. The plate-cathode circuits of tubes 15, 17 include common resistor 48 and, alternately, a center tapped primary 68 of an output transformer 70 or a center tapped series resistor arrangement comprising resistors 72, 74. Switches 76, 78 are provided to connect said primary winding 68 across plates 80, 82, or, alternately, to connect said series resistor arrangement 72, 74 across said plates. It will be apparent that the transformer output is more efficient when an alternating current in the audio frequency range is impressed across terminals 10, 12, and that the resistor output will be used when a direct current or extended frequency range is required. Direct current meters 84, 86 are provided in series with resistors 72, 74, and direct current meter 88 is shunted across said resistors to measure differential voltages appearing thereacross.

Non-linearity of the system may be minimized by an inverse feed-back connection from plates 80, 82 of tubes 15, 17 to the cathodes of the first dual-triode tube througuh resistors 94, 96, said resistors having a high resistance relative to the resistance of resistors 54, 56. The feed-back circuit introduces no phase shift for low frequencies down to 0-cycles per second because no phase shift can occur in the amplifier circuit or the feed-back loop. The inverse feed-back circuit also provides stability of operation.

Having described the invention, the operation of the system will now be set forth. With zero input across terminals 10, 12, the system is adjusted to balance. Adjustment of arm 32 of potentiometer 30 varies the bias on the upper and lower halves of a first dual-triode tube in opposite directions until the currents in the plate-cathode circuits of both halves of the tube are equal. Adjustment of arm 46 of potentiometer 48 adjusts the bias on the grids 42, 44 or a second dual-triode tube, the difference in voltage between cathodes 38, 40 and grids 42, 44 being the bias voltages for the upper and lower halves of the second tube. The voltage drops across resistors 54, 56 are equal, hence the biases on grids 60, 62 are equal. Because of the push-pull output connection, it will be apparent that the output of said system whether it be taken across the center tapped transformer 70 or the center tapped resistor arrangement 72, 74, will be equal to zero.

It will be seen from the above description of the static state of the amplifying system that the output of the first tube feeds directly through the second tube, the plates of the first tube and the corresponding cathodes of the second tube being at the same potential. With the exception of the voltage drop in resistors 54, 56, the potential between ground and source 58 is divided equally between the first and second tubes.

Upon applying an alternating current signal between terminal 10, 12, grid 22 of the first tube becomes more positive as grid 24 becomes more negative. The increased positive potential on grid 22 reduces the impedance of the upper half of the first tube and correspondingly reduces the potential above ground of cathode 38 of the second tube. As a result, grid 42 of the second tube becomes more positive with respect to cathode 38 and effectively reduces the impedance of the upper half of the second tube.

In like manner, a negative voltage impressed on grid 24 increases the impedance of the lower half of the first tube and the lower half of the second tube. Each half of the first tube therefore works into a variable impedance comprising the corresponding half of the second tube in series with a corresponding plate resistor, the impedance of the second tube varying in phase with the impedance of the first tube when a signal is impressed on grids 22, 24 of the first tube.

The varying output from plate 50 of the second tube impresses a varying bias on grid 60 of tube 15, the latter tube being a power output tube. Similarly the varying output from plate 52 of the second tube impresses a varying bias on grid 62 of tube 17, which is also a power output power tube. It will thus be seen that tubes 15 and 17 are fed by potentials that are 180° out of phase in typical push-pull manner. The currents in the primary 68, connected in push-pull to the plates of tubes 15, 17, are therefore 180° out of phase. The resultant voltage induced in primary 68 may be coupled to a speaker through secondary 100 of said transformer 70.

In similar manner, the application of a direct current signal between terminals 10, 12 will cause grid 22 of the first tube to go more positive and grid 24 of said tube to go more negative, or vice-versa if the applied voltage is of opposite polarity. In order to measure the output from tubes 15, 17, the resistive output load 72, 74 can be connected to plates 80, 82 through switches 76, 78. The direction of deflection of indicating devices 84, 86 indicates the direction of current in the corresponding resistive arm and meter 88 indicates the resultant differential voltage. It will thus be seen that this system amplifies in the same way, and in the same amount, currents and voltages whether they are alternating or direct.

The device illustrated in Fig. 1 is thus seen to comprise a push-pull direct coupled amplifier system in which a second vacuum tube is employed as a load resistor for the plate circuit of the first tube, the second tube being connected to provide a variable impedance that varies in phase with the impedance of the first tube. This action provides cascade amplification, and the combined outputs of the first stage and the variable impedance load tube are applied across corresponding grid-cathode circuits of tubes 15, 17.

The system illustrated in Fig. 2 is a modification of the invention illustrated in Fig. 1. In this modification, wherein like reference numerals indicate similar operating components, plate 34 of the first tube is connected to the cathode 38 of the second tube and is also connected to grid 44 of the second tube through resistor 102, which is part of a bridge between plate 34 and ground. Plate 36 is similarly connected to cathode 40 and connected to the opposite grid 42 through resistor 104, which, similarly, forms part of a bridge to ground. Resistor 106 connects between grid 44 and ground and resistor 108 connects between grid 42 and ground to form the other parts of the above mentioned bridges. Feed-back resistor 94 may be connected to plate 80 of tube 15 and cathode 26 of the first tube. Similarly, feed-back resistor 96 may be connected to plate 82 of tube 17 and cathode 28 of the first tube.

The static settings of the modification illustrated in Fig. 2 differs from that of the system illustrated in Fig. 1. Since the system is balanced, resistors 102 and 104 have equal voltage drops and are of such value as to operate grids of tube 13 at optimum ratings.

The operation of the system illustrated in Fig. 2 is similar to that of the system illustrated in Fig. 1, except that the full output of the first tube drives each half of the second tube since the ratio of resistors 102 to 106 and 104 to 108 are approximately 1:10. Therefore, the second tube should be biased sufficiently to accommodate the signal from the first tube. A positive signal applied to terminals 10, and a negative signal applied to terminal 12 cause plate 34 to become momentarily more negative and plate 36 to become momentarily more positive, respectively. The drop across resistor 102 is therefore momentarily less than the drop across resistor 104, making the bias on grid 44 of the second tube more negative and on grid 42 of said tube, more positive, thereby causing a reduction in impedance across the elements 38—54 of the second tube. A positive voltage on grid 22 causes a positive voltage on grid 42. Similarly a negative voltage on grid 24 causes grid 44 to become more negative; thus the impedance of the second tube varies in the same direction as the impedance of the first tube, but at a faster rate, due to the normal bias of the second tube being set to take the output of all of the first tube. Said tubes therefore operate in series and the overall amplification is greater than twice that of the system illustrated in Fig. 1; also the corrective action of the negative feedback is greater, which increases the stability of operation of this system.

The device illustrated in Fig. 2 is thus seen to comprise a push-pull direct coupled amplifier system in which a second stage is used as part of a load resistor for a first stage, the stages being connected in such a manner that their impedances vary in phase. In addition, the total output of the first stage is directly cross-connected to grid and cathode of the second stage, thereby providing more drive to the second stage than obtained from conventional circuits. This system allows connection to a balanced input signal or to a single, or grounded side input signal. The amplifier has inherently good regulation, having no appreciable change in output with normal changes in plate supply voltage.

There has thus been disclosed amplifier means characterized by high gain, stability and linearity. Direct coupling is employed throughout, and in-phase impedance variation is achieved by means of a novel cascaded tube arrangement. It will be realized that the herein above described systems represent a presently preferred embodiment of the invention, and the scope of the invention is pointed out in the appended claims.

What is claimed is:

1. A cascaded amplifying system comprising first, second, and third electron tubes, each of said tubes having at least an anode, a grid and a cathode, means to directly connect the anode of said first tube solely to the cathode of said second tube, means for applying an anode-cathode current potential difference between the anode of said second tube and the cathode of said first tube, whereby the anode-cathode current in said first tube always equals the anode-cathode current in said second tube, means comprising a source of bias voltage for the grid of said second tube, means connecting the grid of said second tube to said source of bias voltage whereby upon application of a signal between the grid and cathode of said first tube the impedance of both of said tubes will vary in phase, a load impedance connected to the anode of said second tube, wherein said anode-cathode current potential difference is applied to the anode of said second tube through said load impedance, the grid of said third tube being directly connected to the anode of said second tube, said third tube having a load impedance in series with its cathode, the potential drop across said cathode load comprising said source of bias voltage.

2. An amplifying system as in claim 1 including an output transformer and an output resistance net work and switching means for connecting one or the other of said outputs across said third tube.

3. An amplifying system comprising two channels connected in push-pull, each of said channels including first, second and third electron tubes, each of said tubes having at least an anode, a grid and a cathode, means to directly connect the anode of said first tube of said first channel solely to the cathode of said second tube of said first channel and means to directly connect the anode of said first tube of said second channel solely to the cathode of said second tube of said second channel, means for applying an anode-cathode current potential difference between the anode of said second tube of each channel and the cathode of said first tube of each channel, whereby the anode-cathode current in said first tube of each channel always equals the anode-cathode current in said second tube of that channel, means comprising a source of bias voltage for the grid of said second tube of each channel, means connecting the grid of said second tube of each channel respectively, to said source of bias voltage whereby upon application of a signal between the grids of the first tubes of said first and second channels, the impedance of both tubes of each one of the channels will vary in phase, a load impedance connected, respectively, to the anode of said second tube of each channel, wherein said anode-cathode current potential is applied to the anode of said second tube of each channel through said load impedance, the grid of said third electron tube of each respective channel being directly connected to the anode of the second tube thereof, and a common impedance in series with the cathodes of the third electron tubes of both of said channels, the potential drop across said common cathode impedance comprising said source of bias voltage.

4. An amplifying system, as in claim 3, including an output transformer and an output resistance network, switching means for connecting one or the other of said outputs across said third electron tubes.

CARLTON E. BESSEY.

References Cited in the file of this patent

UNITED STATES PATENTS

| Number | Name | Date |
|---|---|---|
| 1,886,386 | Francis | Nov. 8, 1932 |
| 2,032,193 | White | Feb. 25, 1936 |
| 2,353,876 | Cawein | July 18, 1944 |
| 2,424,893 | Mansford | July 29, 1947 |
| 2,474,435 | Moore | June 28, 1949 |
| 2,531,458 | Nye | Nov. 28, 1950 |
| 2,538,487 | Volkers | Jan. 16, 1951 |